United States Patent [19]

Dooley

[11] 4,392,438
[45] Jul. 12, 1983

[54] COAL TRANSPORT SYSTEM

[75] Inventor: James L. Dooley, Santa Monica, Calif.

[73] Assignee: R & D Associates, Marina del Rey, Calif.

[21] Appl. No.: 275,911

[22] Filed: Jun. 22, 1981

[51] Int. Cl.³ .............................................. F23K 3/02
[52] U.S. Cl. ........................... 110/106 R; 110/104 R; 110/263
[58] Field of Search ............... 110/106 R, 104, 101 R, 110/347, 263

[56] References Cited

U.S. PATENT DOCUMENTS

| | | | |
|---|---|---|---|
| 2,251,029 | 7/1941 | Barton | 110/106 |
| 2,716,002 | 8/1955 | Craig | 110/106 |
| 2,916,217 | 12/1959 | Yellott | 110/106 |
| 3,821,342 | 6/1974 | Hurd | 110/106 |
| 4,092,094 | 5/1978 | Lingl, Jr. | 110/106 |
| 4,182,245 | 1/1980 | Stewart et al. | 110/106 |
| 4,193,773 | 3/1980 | Staundinger | 431/354 |
| 4,197,092 | 4/1980 | Bretz | 110/104 R |
| 4,249,471 | 2/1981 | Gunnerman | 110/106 |
| 4,250,816 | 2/1981 | Angerine et al. | 110/106 |
| 4,310,299 | 1/1982 | Binasik et al. | 110/106 |
| 4,313,386 | 2/1982 | Boldt et al. | 110/104 R |

Primary Examiner—Henry C. Yuen
Attorney, Agent, or Firm—Poms, Smith, Lande & Rose

[57] ABSTRACT

Coal energy is delivered from the mine to a distant point of use by a system involving the pulverization of the coal at the mine, and carrying it as a nonexplosive suspension in a pipeline or conduit, with high pressure coal gas which is made at the mine being employed as the transport medium. At the delivery point, the gas, as well as the coal dust can be fired directly into the furnace, or the coal can be separated from the coal gas and stored. Arrangements are provided for insuring that the finely pulverized coal may be maintained in suspension within the transport pipe, and such arrangements may include spiraling vanes to insure that settling particles are reintroduced into the main gas stream, and separate sections within the pipe, or a supplemental pipe for the high pressured gas to permit restarting of the flow in the event of a power failure and the settling out of the particles.

13 Claims, 10 Drawing Figures

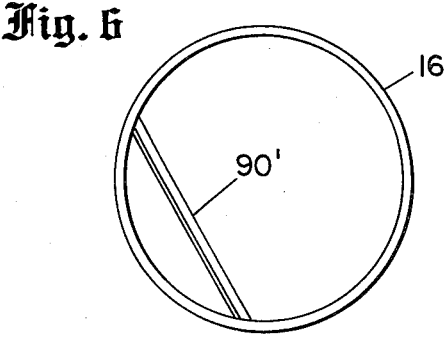
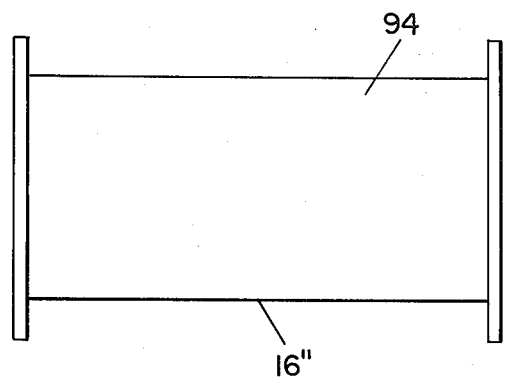
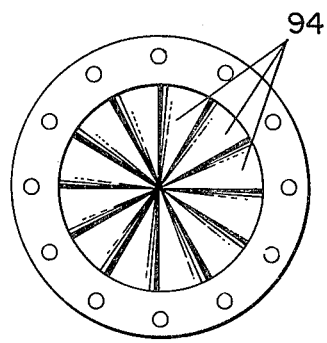
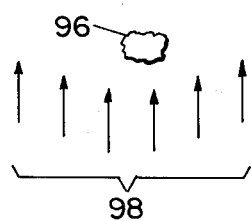
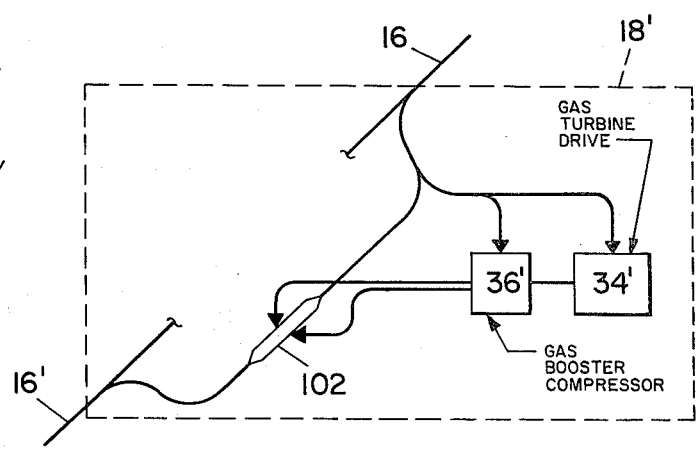

COAL TRANSPORT SYSTEM

FIELD OF THE INVENTION

This invention relates to the transport of pulverized coal from the mine to a remote point of use.

BACKGROUND OF THE INVENTION

The bulk of coal transport from the mine to a point of use is accomplished by rail transport, and it has also been proposed to transport pulverized coal from the mine to the point of use by water or oil slurry pipelines. The expansion of railroad unit trains, which now move most of the coal presently used, has many cost limitations, and would have an adverse impact on the environment, as well as using liquid fossil fuel for train propulsion. The use of pipelines and water slurries are satisfactory from an operational standpoint, but the best mine fields are desperately short of water, without the need to use it for slurry transport, while at the delivery end the water degrades the coal and must be removed, as well as clarified as it is returned to the environment.

It is also noted that, in the event that pulverized coal is transported with oxygen containing air as the suspending gas, a dangerous explosive mixture would be present, which could easily be ignited by static electricity generated by the flow of the coal through the pipeline.

A principal object of the present invention is to provide an improved method of transporting coal from the mine to the point of use, which will avoid many of the problems with the previously proposed systems, as outlined hereinabove.

SUMMARY OF THE INVENTION

In accordance with the present invention, coal is finely pulverized at a first location, such as a coal mine, and is carried in a pipeline to the point of use in a gas suspension, using coal gas, which may also be made at the mine location.

Additional features of the invention include the following:

1. Special arrangements may be provided to maintain the pulverized coal in suspension within the pipe, and these arrangements may take a number of forms including helical vanes extending along the periphery of the pipeline and particularly at the bottom of the pipeline, and/or the provision of a separate gas passageway to blow particles which might fall out of suspension toward the bottom of the pipe back into suspension. Special arrangements may also be provided to maintain suspension and avoid undue abrasion at turns in the pipe.
2. Booster stations powered by the coal gas and/or the coal dust, may be provided as needed along the length of the pipeline, so that no separate source of power or electric lines are needed in remote or isolated areas through which the pipeline may pass.
3. The pulverized coal may be fed directly into the furnace along with the suspending coal gas at the point of use, particularly where the principal use involves one or more large utility installations having substantial and continuous fuel needs.

Advantages of the present system include freedom from the water problems, both as to availability and environmental requirements, as well as the avoidance of the need to dry out the coal at the point of use. In addition, the problems of increased capacity and liquid fossil fuel use inherent in the expansion of unit railroad trains is avoided.

Other objects, features and advantages of the present invention will become apparent from a consideration of the following detailed description and of the accompanying drawings.

BRIEF DESCRIPTION OF THE DRAWINGS

FIG. 6 shows an alternative high pressure passageway for introducing gas at bends in the pipeline;

FIGS. 7 and 8 are a transverse cross-sectional view and an end view, respectively, of an alternative arrangement for introducing rotary flow into the gas and coal particle mixture passing down the pipe;

FIG. 9 is a diagram useful in the analysis of the coal particle support in the gas stream; and FIG. 10 shows an alternative booster station which may be used in the system of FIG. 1.

DETAILED DESCRIPTION

Figure 1:
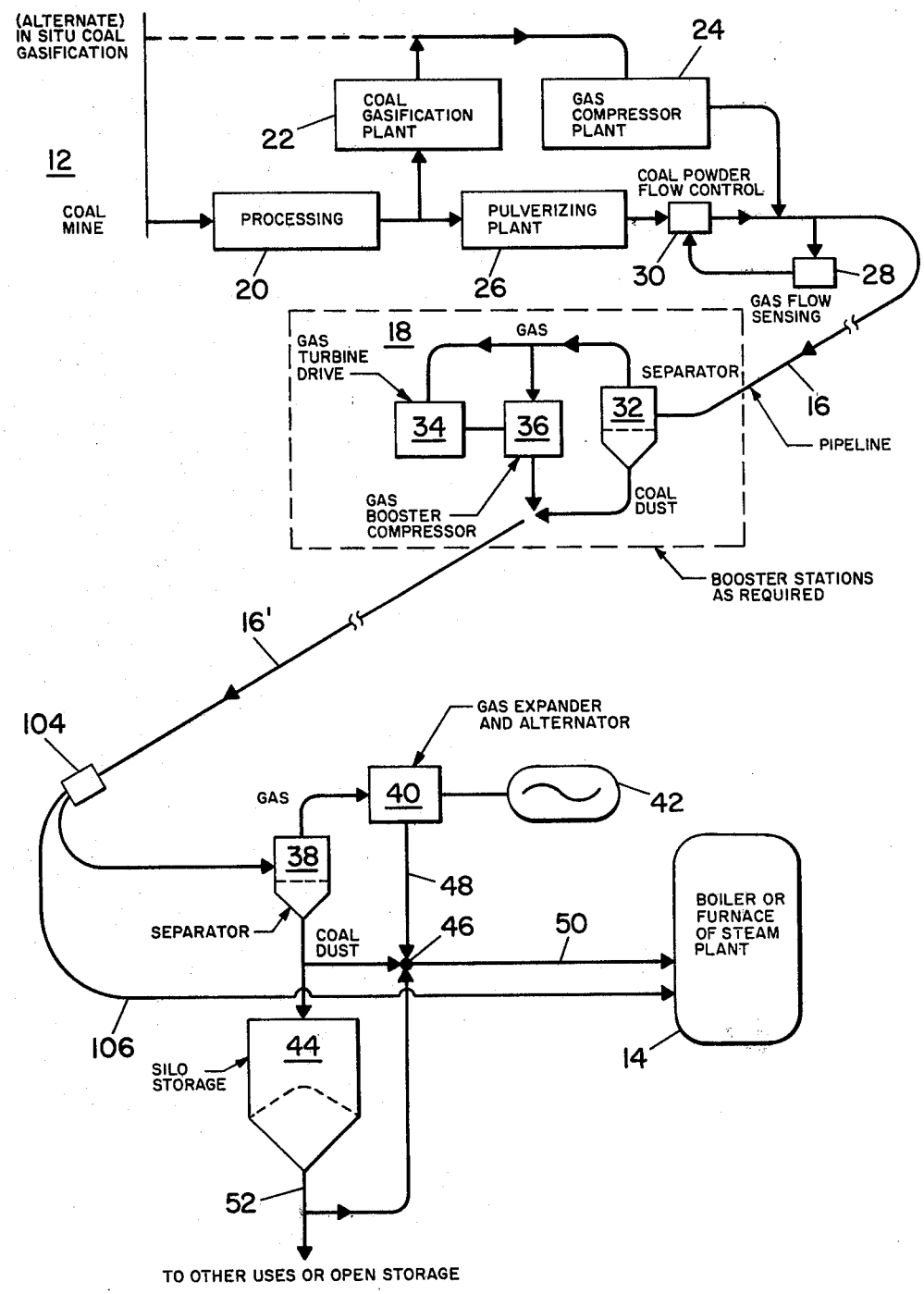
FIG. 1 is a diagrammatic showing of a complete coal particle transport system illustrating the principles of the invention.

Referring more particularly to the drawings, in FIG. 1 the coal mine is indicated at reference numeral 12 and the boiler or furnace of the steam plant where the coal will be employed as a fuel is indicated by reference numeral 14. The extended pipeline or conduit interconnecting the coal mine site and the location of the boiler and furnace is indicated by the reference numerals 16 and 16', with one or more intermediate booster stations 18 being located along the length of the pipeline 16, 16'.

At the coal mine site, initial conventional processing is indicated by the block 20. Some of the processed coal will be employed to supply energy for the compression of the gas which will be employed to move the pulverized coal down the pipeline. Some of the remainder of the coal will be employed to manufacture low Btu gas which is the non-oxidizing transport medium for the coal particles. This conventional process is indicated by the block 22, with the gas compressor being represented by the block 24 in the diagram of FIG. 1. The bulk of the coal will be cleaned, dried, and pulverized to pass through a fine mesh screen (in the order of 200 mesh) for transport as powder down the pipeline 16. The pulverizing plant 26 is also indicated as being located at the coal mine site in FIG. 1.

A gas flow sensor 28 provides signals to the coal powder flow control unit 30 to avoid feeding additional coal into the pipeline, if for any reason, the flow of gas is being retarded along the length of the pipeline 16, 16'.

The booster stations 18 may be in any desired form and will normally be powered by the low Btu coal gas or the coal particles being transported through the pipeline. As shown at 18 in FIG. 1, the booster station may include a separator unit 32, a gas turbine drive 34, and a booster compressor unit 36. Alternative booster station arrangements may include the diversion of a small portion of the gas and/or coal particles to power a booster pump, and the supplying of additional forward thrust to the coal particles and gas being transmitted down the pipeline through forwardly directed nozzles circumferentially arranged around a pipe line section, as indicated schematically in FIG. 10 described below. Other suitable booster station arrangements may be employed. Further, the number of booster stations which are provided will be substantially more than those required to maintain continuous flow of the gas and particulate material, so that, when one of the booster stations is down for repairs, or routine maintenance, there will be no interruption of the flow.

The terminal station may include the separator 38 from which the gas is supplied to the expander 40 which may power an electric generator 42, while the coal dust may be routed either to silo storage 44 or directly to point 46 where it may be recombined with the low Btu gas supplied through line 48 which may be employed to carry the coal dust along line 50 to the boiler or furnace 14. As indicated in FIG. 1, the separated particulate coal from the silo storage 44 may be routed as indicated by the line 52 to other uses or to open storage.

Particularly for large installations where substantially continuous operation takes place, the valve 104 may direct a portion or all of the incoming coal particle and coal gas suspension through line 106 directly into the furnace 14.

Figure 2:
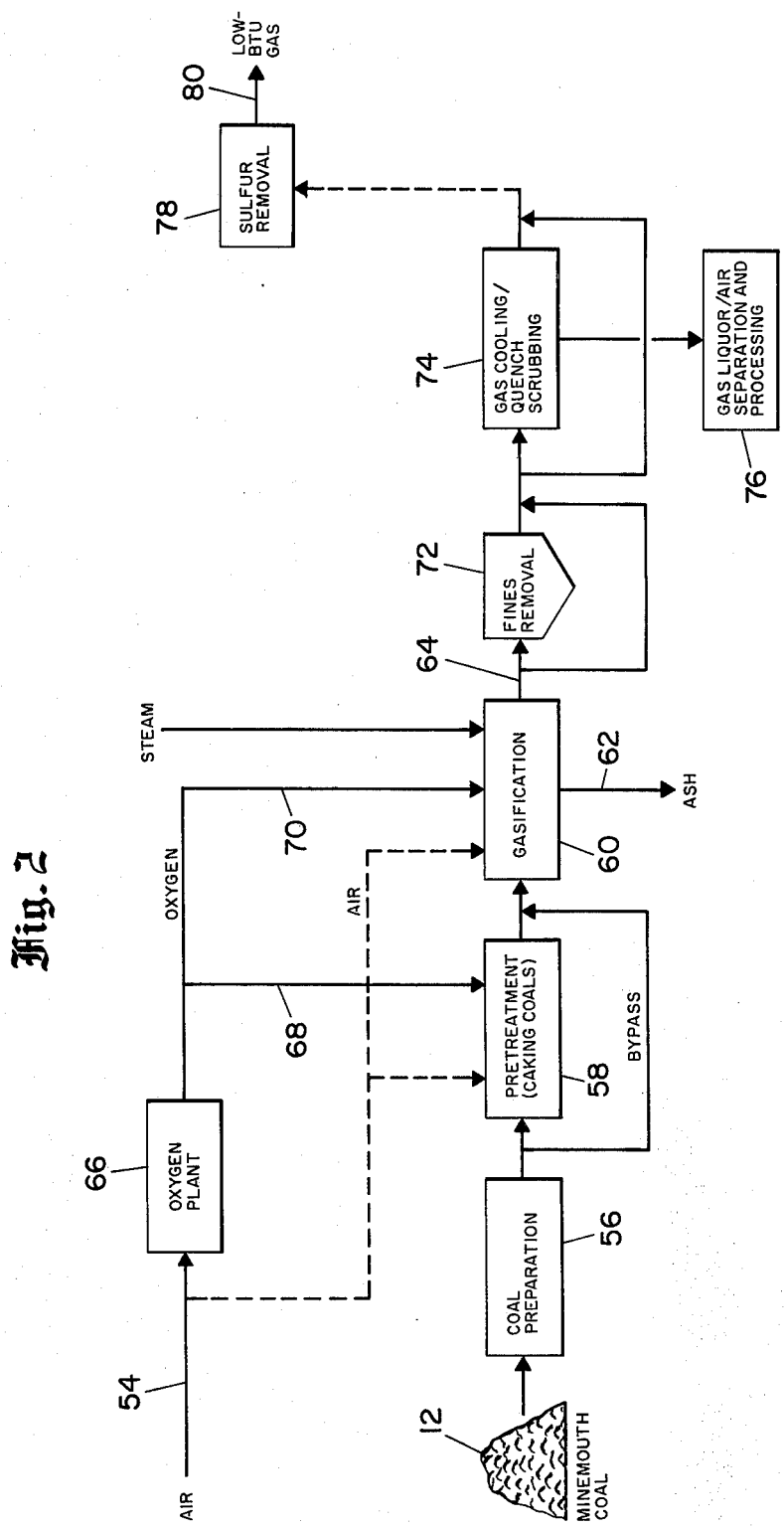
FIG. 2 illustrates in greater detail the mine head installation which could be employed in the system of FIG. 1.

FIG. 2 represents a generally conventional arrangement for forming low Btu coal gas from coal and steam. Essentially it involves a process in which the inputs are carbon from the coal, oxygen, and steam, in addition to air, and the result is carbon monoxide and hydrogen gas from the steam, in addition to the inert nitrogen included in the air. The presence of the nitrogen means that the energy content of the gas is relatively low. On the other hand, the resultant mixture of the coal gas and the suspended coal particles is not explosive, and therefore cannot be ignited by static electricity, sparks, or the like which might be generated as the particles flow down the pipe.

With reference to the blocks shown in FIG. 2, the mine mouth coal is indicated by reference numeral 12, and input air is supplied at 54. The initial coal preparation steps are indicated by the blocks 56 and 58. The gasification apparatus is indicated by reference numeral 60 and has as inputs the coal, air, oxygen, and steam; with the output being ash from the spent coal indicated by the arrow 62 and the output untreated coal gas at conduit 64. Incidentally, the optional oxygen plant 66, if used, is employed to provide the oxygen inputs 68 and 70 to the apparatus 58 and 60. The residual particles of ash and any partially burned coal are removed in the unit 72, further gas processing is accomplished in the apparatus 74, involving the cooling and scrubbing of the gas, and condensable (burnable) liquids are captured by the apparatus 76. A final processing step including sulphur removal is indicated by block 78, and the low Btu gas appearing at conduit 80 is supplied to the gas compressor plant unit 24 as shown in FIG. 1 to be supplied to the pipeline or conduit 16.

Now, in conjunction with FIGS. 3 through 8, various structures will be described which serve the purpose of maintaining the finely divided coal particles in suspension within the pipe as the flow continues. As will be discussed in some detail in connection with FIG. 9, inducing a rotary flow of the gas passing down the pipe will insure that particles which tend to settle out to the bottom of the pipe will be picked up and again brought into suspension. While the required rotation of the longitudinally flowing gas for maintaining the particles in suspension will vary, depending on the size of particles and the velocity of flow, a complete rotation of the fluid by about 360 degrees within 200 feet will normally be sufficient to maintain all particles in suspension.

Figure 3:
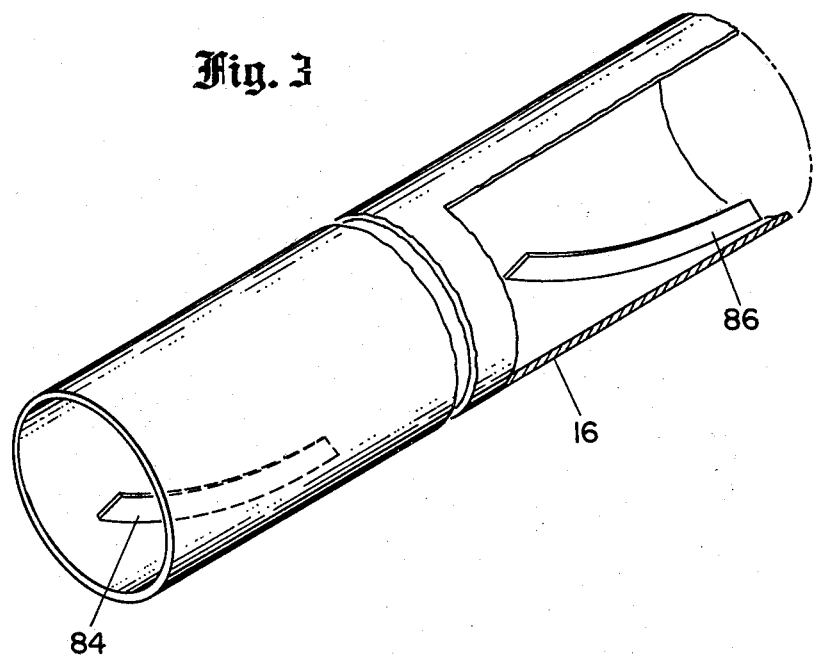
FIG. 3 indicates schematically a pipe construction including spiralling vanes for maintaining pulverized coal particles in suspension.

In FIG. 3, the pipe or conduit 16 is provided with vanes 84 and 86 which may be located only in the lower sections of the pipe. They could also extend all the way around the inner surface of the conduit, but they are primarily needed at the bottom. These vanes may extend for an angle of perhaps 45 degrees to the left and right of the center of the pipe, thus encompassing a total angular extent of approximately 90 degrees at the bottom of the pipe 16, over a distance of perhaps 50 feet. The helix defined by the vanes 84 and 86 is such that, if the vanes were continued for a full 200 feet, they would have passed through 360 degrees when viewed directly along the axis of the pipe. However, as may be appreciated, this angle is relatively shallow and the vanes 84 and 86 make only a very slight angle with a line parallel to the axis of the pipe, and extending along the inner periphery of the pipe. The vanes need not be of any very substantial radial extent, but with a pipe having a 40 inch diameter, the vanes might have a height of approximately 3 or 4 inches. It is contemplated that the sections of pipe carrying the vanes will be marked exteriorly to indicate the location of the vanes within the pipes and to insure proper orientation.

Figure 4:
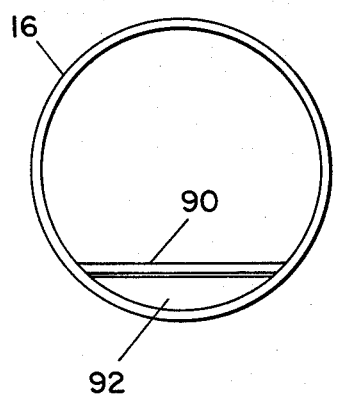
FIGS. 4 and 5 show a supplemental high pressure gas passageway for maintaining the particles in suspension.
Figure 5:
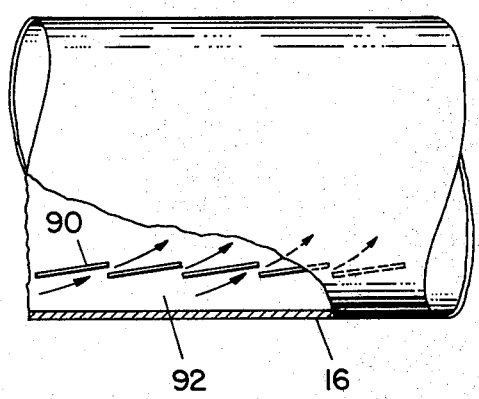

FIGS. 4 through 6 illustrate the supplying of booster gas through a longitudinally extending passageway to avoid settling out of the coal particles from the gas and to assist in the maintenance of high speed particle and gas suspension flow down the length of the conduit.

As indicated in FIGS. 4 and 5, the pipe 16 may be provided with vanes 90, normally located along the bottom of the pipe, through which booster gas may be provided from the passageway 92. With the gas being directed upwardly through the slots or nozzle-like apertures between the vanes 90, additional forward thrust is given to the body of the gas and particles within the pipe 60, and further impetus and increased velocity of flow will result.

For use in bend sections, the set of vanes 90' may be arranged as shown in FIG. 6, assuming that the bend is from left to right, as viewed along the axis of the pipe 16. This location of the vanes will tend to prevent undue wear of the pipe on the left-hand side, and also prevent the accumulation of coal particles at this location.

Instead of the spiral vanes 84, 86, as shown in FIG. 3 of the drawings, a set of sheet metal blades or vanes 94 may be provided in a short section of the pipe designated 16". These vanes 94 may have a slight angular orientation so as to provide a amall angular component of rotation of the gas and particle suspension traveling down the length of the tube. Preferably the vanes 94 should be very thin and tapered at their leading and trailing edges to avoid the introduction of drag or turbulence more than is absolutely required. Accordingly, in order to assist in maintaining the particles in suspension, any or all of the techniques shown in FIGS. 3 through 8 may be employed, with those shown in FIGS. 4, 5 and 6 being particuarly applicable for use at an intermediate booster station such as that located at 18' as shown in FIG. 10 of the drawings.

FIG. 9 is a diagram showing a coal particle 96 suspended by upwardly directed gas flow as indicated by the arrows 98. In the following analysis, the gas flow required to maintain the particle in suspension in the case of a directly upward gas flow will initially be developed; and then the corresponding relationship giving the required angular or rotational flow of the gas and particle suspension required for maintaining an individual particle in suspension will be developed.

A particle will be supported in an upward flowing gas stream when the aerodynamic drag of the particle equals its weight, assuming vertical gas flow.

Weight = Drag

Particle volume × density = dynamic gas pressure × exposed area × drag factor $$\frac{\pi}{6} d^3 \delta = \tfrac{1}{2}\rho v^2 C_D A$$

where $d$ = particle nominal diameter — in = 0.004 in $\delta$ = particle density (lb/in$^3$) = 0.05

$\rho$ = kinematic gas density = lb/ft$^3$ $v$ = gas velocity — ft/s $A$ = frontal area — (ft$^2$) = $\dfrac{\pi d^2}{4 \times 144}$ $C_D$ = Drag coefficient ~1.0

$$\frac{d\delta}{6} = \frac{\rho v^2 C_D}{2 \times 32.2 \times 4 \times 144}$$

$$v^2 = 6182 \frac{d\delta}{\rho C_D}$$

$$v^2 = 6182 \frac{0.004 \times 0.05}{3.75 \times 1.0} = 0.33$$

$v = 0.57$ ft/s ≈ 0.18 m/s

This is an estimate of the dense gas velocity required to lift these fine particles vertically. A lower velocity should move them horizontally.

For example, if the gas velocity is 20 ft/s (6.1 m/s) down the pipe it must rotate one turn every 367 ft in a 40 inch diameter pipe to insure particle suspension. This figure is reached by calculating the time required for a particle to travel around the inner periphery of the 40 inch diameter pipe at a speed of 0.18 meters/second, and the time for one circuit is about 18 seconds. With the gas velocity along the pipe being about 20 feet per second, the 367 feet figure is obtained. For the purposes of the vanes in FIG. 3 a figure of 200 feet for one revolution was employed, to give an additional margin of safety.

An alternative booster station arrangement is shown in FIG. 10. The booster station of FIG. 10 is designated by the reference numeral 18' and may be substituted for, or placed in parallel with the booster station 18 as shown in FIG. 1 of the present drawings. The booster station arrangement of FIG. 10 differs from that of unit 18 in FIG. 1 essentially in the omission of the separation step. More specifically, the booster station as shown in FIG. 10 includes the gas turbine drive unit 34' and the compressor 36'. The unit 102 as shown in FIG. 10 involves the principle that additional gas pressure is supplied to the gas and suspended coal particles, without the need for full separation. More specifically, the additional high pressure coal gas, as compressed by the compressor 36' is supplied through nozzles or openings directed in the forward direction along the pipeline 16 to increase the flow velocity and to insure that particles do not separate out of suspension. Structures such as those shown in FIGS. 4, 5 and 6 may be used at the booster station 18', with the supplemental high pressure goal gas being supplied to passageway 92 in FIG. 5, for example. Preferably, gas directed to the turbine drive 34' and to the compressor 36' is drawn from the top of the conduit 16, so that a minimum of particulate material is included in the gas routed to these units.

By way of completeness, certain additional factors may be noted. First, it is contemplated that the conduits or pipelines could be moderately long, in the order of 500 to 1000 miles, for example, in length, to bring coal from coal deposit concentrations to industrial areas of the United States. In such cases the booster stations could be located every 50 to 100 miles, or so, depending on other design parameters of the system. The pressure of the applied gas would normally be in the order of about 300 psi up to about 2,000 pounds per square inch, with the physical pipe design and coal particle size, as well as the intended spacing of the booster stations all being inter-related factors. Using a 100 mesh screen the maximum particle size would be about 0.006 inch in diameter, while with a 200 mesh screen the maximum particle size would be about 0.003 inch. The diameter of the pipe might be in the order of 40 inches, but larger or smaller diameter pipes could also be used.

It is to be understood that the foregoing description relates to one system illustrating the principles of the invention. Other arrangements may also be employed to implement the system without departing from the spirit and scope of the invention. By way of specific example, the booster station pattern may include parallel units each with adequate capacity to maintain the coal particles in suspension, and other forms of non-explosive gases may be employed as the carrier gas for the pulverized coal particles. Suitable alternative controls for restricting the flow of input coal when the line is to be shut down, or upon failure of the booster station may also be provided. Accordingly, the present invention is not limited to that precisely as shown and described herein.

What is claimed is:

1. An economical system for transporting coal from a first location where coal is abundant and inexpensive to a utilization point, as a non-explosive particulate suspension in gas comprising:

means for forming coal gas from coal at said first location;

means for pulverizing coal into very fine particles at said first location;

an extended length conduit more than one mile in length extending from said first location to said utilization point;

means for compressing said coal gas at said first location;

means for supplying said coal particles and the pressurized coal gas to said conduit with the coal particles suspended in said coal gas to form a non-explosive two phase system;

means for collecting and utilizing both said coal particles and said coal gas at the other end of said extended conduit; and means for maintaining said coal particles in suspension in said coal gas as the suspension passes through the conduit, said means for maintaining said coal particles in suspension including means for rotating the suspension as it passes along the length of said conduit comprising vanes mounted within said conduit and oriented at an angle with respect to the longitudinal axis of said conduit.

2. A safe and economical coal transport system as defined in claim 1 further comprising means for passing the coal particles through a fine mesh screen prior to application to the conduit, to eliminate oversize coal particles which might otherwise settle out.

3. A safe and economical coal transport system as defined in claim 1 further comprising one or more booster pumping station means located between the ends of said conduit, to increase the flow of the suspension along the pipeline.

4. A safe and economical coal transport system as defined in claim 1 further comprising means for utilizing the high pressure of the suspension for performing useful work or generating power at said other end of said conduit.

5. A safe and economical coal transport system as defined in claim 1 further including means, located along the length of said conduit, for directing coal gas into said conduit in the direction of flow of said suspension, at high pressure, to increase the rate of flow of said suspension, and to reduce the tendency of the coal particles to settle out.

6. A safe and economical coal transport system as defined in claim 5 wherein said directing means includes a passageway extending parallel to said conduit, a series of forwardly directed openings between said passageway and said conduit and means for supplying the coal gas under high pressure to said passageway.

7. A safe and economical coal transport system as defined in claim 6 wherein said passageway and openings are located at the bottom of a substantially straight section of said conduit.

8. A safe and economical coal transport system as defined in claim 6 wherein said passageway and openings are located on the outer lower side of a curved section of said conduit.

9. A safe and economical coal transport system as defined in claim 6 further comprising means for stopping the introduction of additional coal particles at the input to said conduit when the flow down said conduit decreases below a predetermined level.

10. A safe and economical coal transport system as defined in claim 1 wherein said system includes means for burning both the coal gas and said coal particles at said other end of said conduit.

11. A safe and economical coal transport system as defined in claim 1 wherein said conduit is more than 10 miles long.

12. A safe and economical coal transport system as defined in claim 1 wherein said conduit is more than 100 miles long.

13. A safe and economical coal transport system as defined in claim 1 including means for supplying the suspension of the pulverized coal in the coal gas from said conduit directly to a combustion means in which both the gas and the particles are burned.

* * * * *